(12) United States Patent
Kuo

(10) Patent No.: US 11,051,662 B1
(45) Date of Patent: Jul. 6, 2021

(54) TOWEL HOLDER

(71) Applicant: Anthony Kuo, Taichung (TW)

(72) Inventor: Jerry Kuo-Yung Kuo, Taichung (TW)

(73) Assignee: Anthony Kuo

( * ) Notice: Subject to any disclaimer, the term of this patent is extended or adjusted under 35 U.S.C. 154(b) by 0 days.

(21) Appl. No.: 17/142,358

(22) Filed: Jan. 6, 2021

(30) Foreign Application Priority Data

Oct. 7, 2020  (TW) ................................. 109213177

(51) Int. Cl.
  *A47K 10/10*  (2006.01)
(52) U.S. Cl.
  CPC .................................. *A47K 10/10* (2013.01)
(58) Field of Classification Search
  CPC ........ A47K 10/10; A47K 10/04; A47K 10/08; A47K 10/12; A47K 10/14; A47K 2201/00; A47K 2201/02; A47K 2201/025
  USPC ........ 211/16; 248/251, 309.1, 316.8, 220.21, 248/222.13, 222.14, 224.7
  See application file for complete search history.

(56) References Cited

U.S. PATENT DOCUMENTS

| | | | | |
|---|---|---|---|---|
| 3,096,731 | A * | 7/1963 | Lehman ................. | A47K 10/04 108/29 |
| 4,979,713 | A * | 12/1990 | Bell ....................... | A47K 10/10 248/221.11 |
| 5,186,427 | A * | 2/1993 | Semchuck ............. | A47K 10/04 248/224.7 |
| 5,875,903 | A * | 3/1999 | Chen ...................... | A47K 10/10 211/105.1 |
| 6,199,808 | B1 * | 3/2001 | Lin ......................... | A47K 10/10 211/105 |
| 6,364,264 | B1 * | 4/2002 | Lai ......................... | A47K 10/04 211/105 |
| 6,430,759 | B1 * | 8/2002 | Beltran .................. | A47K 5/04 211/105.1 |
| 6,796,442 | B1 * | 9/2004 | Wu ........................ | A47K 10/04 211/105.1 |
| 7,111,336 | B1 * | 9/2006 | Lai ......................... | A47K 10/04 211/105.1 |
| D543,755 | S * | 6/2007 | Bauer ............................ | D6/550 |
| D543,756 | S * | 6/2007 | Gilbert .......................... | D6/550 |
| 7,316,324 | B1 * | 1/2008 | Myllykangas ......... | A47K 10/04 211/105.1 |
| D563,526 | S * | 3/2008 | Bauer .......................... | D23/249 |
| 8,430,369 | B2 * | 4/2013 | Hsu ........................ | A47K 10/04 248/222.14 |

(Continued)

*Primary Examiner* — Jonathan Liu
*Assistant Examiner* — Devin K Barnett
(74) *Attorney, Agent, or Firm* — The Webb Law Firm

(57) ABSTRACT

A towel holder includes a fixing unit and a holder unit. The fixing unit includes a fixed element and a connecting element. The fixed element has a receiving surface inclined relative to the horizontal axis to form an angle therebetween. The fixed element includes a mounting portion formed in the middle thereof and detachably mounted with the connecting element. The holder unit is detachably mounted to the connecting element and includes a holder element that has a mounting surface abutting against the receiving surface, and top and bottom edges connected to the mounting surface and vertically and horizontally spaced apart from each other such that two opposite ends of the towel hung on the holder element are spaced apart from each other by a horizontal distance greater than that between the top and bottom edges.

14 Claims, 9 Drawing Sheets

(56) References Cited

U.S. PATENT DOCUMENTS

| | | | | |
|---|---|---|---|---|
| 9,220,340 B2 * | 12/2015 | Kuo | | A47B 47/0058 |
| 9,282,854 B2 * | 3/2016 | Kuo | | A47K 10/10 |
| 9,351,572 B2 * | 5/2016 | Kuo | | A47K 10/10 |
| D775,856 S * | 1/2017 | Kuo | | D6/550 |
| D782,281 S * | 3/2017 | Kuo | | D8/349 |
| D810,463 S * | 2/2018 | Kuo | | D6/550 |
| 9,888,767 B1 * | 2/2018 | Gao | | A47G 25/0685 |
| 10,051,959 B1 * | 8/2018 | Glidewell | | A47B 61/02 |
| 2002/0023993 A1 * | 2/2002 | Fleischmann | | A47K 10/10 |
| | | | | 248/315 |
| 2002/0104946 A1 * | 8/2002 | Lai | | A47K 10/04 |
| | | | | 248/316.8 |
| 2003/0189126 A1 * | 10/2003 | Hale | | A47K 10/405 |
| | | | | 242/596.4 |
| 2003/0189127 A1 * | 10/2003 | Arendt | | F21V 33/004 |
| | | | | 242/598.5 |
| 2004/0187204 A1 * | 9/2004 | Ouyoung | | A47K 10/12 |
| | | | | 4/576.1 |
| 2004/0221382 A1 * | 11/2004 | Ouyoung | | A47K 10/04 |
| | | | | 4/559 |
| 2006/0175496 A1 * | 8/2006 | Lai | | A47K 10/10 |
| | | | | 248/251 |
| 2009/0242712 A1 * | 10/2009 | Thompson | | F16M 13/02 |
| | | | | 248/221.11 |
| 2009/0242713 A1 * | 10/2009 | Lowe | | A47K 10/10 |
| | | | | 248/222.13 |
| 2009/0314730 A1 * | 12/2009 | Mansikkamaa | | A47L 17/00 |
| | | | | 211/113 |
| 2012/0067837 A1 * | 3/2012 | He | | F16B 9/023 |
| | | | | 211/123 |
| 2012/0145854 A1 * | 6/2012 | Smith | | A47K 10/10 |
| | | | | 248/226.11 |
| 2013/0160273 A1 * | 6/2013 | Schuetz | | A47F 5/0838 |
| | | | | 29/428 |
| 2014/0026402 A1 * | 1/2014 | Austin, III | | A47K 10/04 |
| | | | | 29/700 |
| 2014/0306079 A1 * | 10/2014 | Kuo | | F16B 9/05 |
| | | | | 248/222.14 |
| 2017/0082239 A1 * | 3/2017 | Wu | | E03C 1/066 |
| 2017/0336020 A1 * | 11/2017 | Jones | | A47K 10/04 |
| 2017/0343205 A1 * | 11/2017 | Heuer | | F21V 23/0464 |
| 2018/0340562 A1 * | 11/2018 | Kuo | | F16B 12/38 |
| 2021/0062966 A1 * | 3/2021 | Woolman | | A47G 1/1606 |

* cited by examiner

TOWEL HOLDER

CROSS-REFERENCE TO RELATED APPLICATION

This application claims priority to Taiwanese Patent Application No. 109213177 filed Oct. 7, 2020, the disclosure of which is hereby incorporated by reference in its entirety.

BACKGROUND OF THE INVENTION

Field of the Disclosure

The disclosure relates to an object holder, more particularly to a towel holder.

Description of Related Art

Referring to FIG. 1, a conventional towel holder 1 includes two brackets 11 and a holder 12. The brackets 11 extend along a horizontal axis (D) from a wall 2 and are spaced apart from each other along a transverse direction transverse to the horizontal axis (D). The holder 12 is, e.g., an elongated plank, extends along the transverse direction, and is connected between the brackets 11 for hanging an object 3 such as a towel, a bath towel, and clothes thereon. Since the holder 12 is vertical (i.e., two side surfaces of holder 12 are generally vertical), two opposite ends 31 of the object 3 hung on the holder 12 are spaced apart from each other by a horizontal distance the same as a thickness of the holder 12. As a result, it is relatively difficult for a moist towel to ventilate and be air-dried, so that the towel tends to produce musty smell.

Another conventional towel holder includes a vertical plate-shaped holder (not shown) having a thickness larger than that of the holder 12 to increase a horizontal distance between the two opposite ends of the object hung thereon. However, such towel holder occupies a relatively large space, and the cost for manufacturing such towel holder is increased.

SUMMARY

Therefore, an object of the disclosure is to provide a towel holder capable of alleviating the drawbacks of the conventional towel holder.

According to an aspect of the disclosure, a towel holder adapted to be mounted on a wall is provided. The towel holder includes at least one fixing unit and a holder unit. The fixing unit extends along an axis and includes a fixed element and a connecting element. The fixed element has an abutment surface and a receiving surface. The abutment surface is adapted to contact the wall. The receiving surface is opposite to the abutment surface along the horizontal axis and is inclined relative to the horizontal axis to form a first included angle between the horizontal axis and the receiving surface. The fixed element includes a mounting portion formed between the abutment surface and the receiving surface. The connecting element is detachably mounted to the mounting portion.

The holder unit is detachably mounted to the connecting element and includes a holder element. The holder element has a mounting surface and top and bottom edges. The mounting surface is complementary in shape with and abuts against the receiving surface. The top and bottom edges are connected to the mounting surface and are vertically and horizontally spaced apart from each other such that two opposite ends of the towel hung on the holder element are spaced apart from each other by a horizontal distance greater than that between the top and bottom edges.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
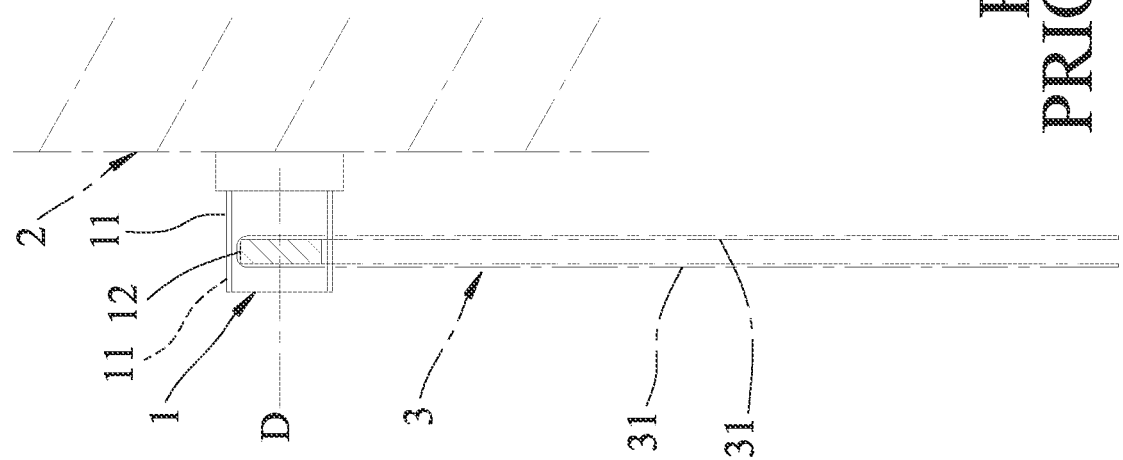
FIG. 1 is a schematic partly sectional view of a conventional towel holder and a towel hung on the conventional towel holder.
Figure 2:
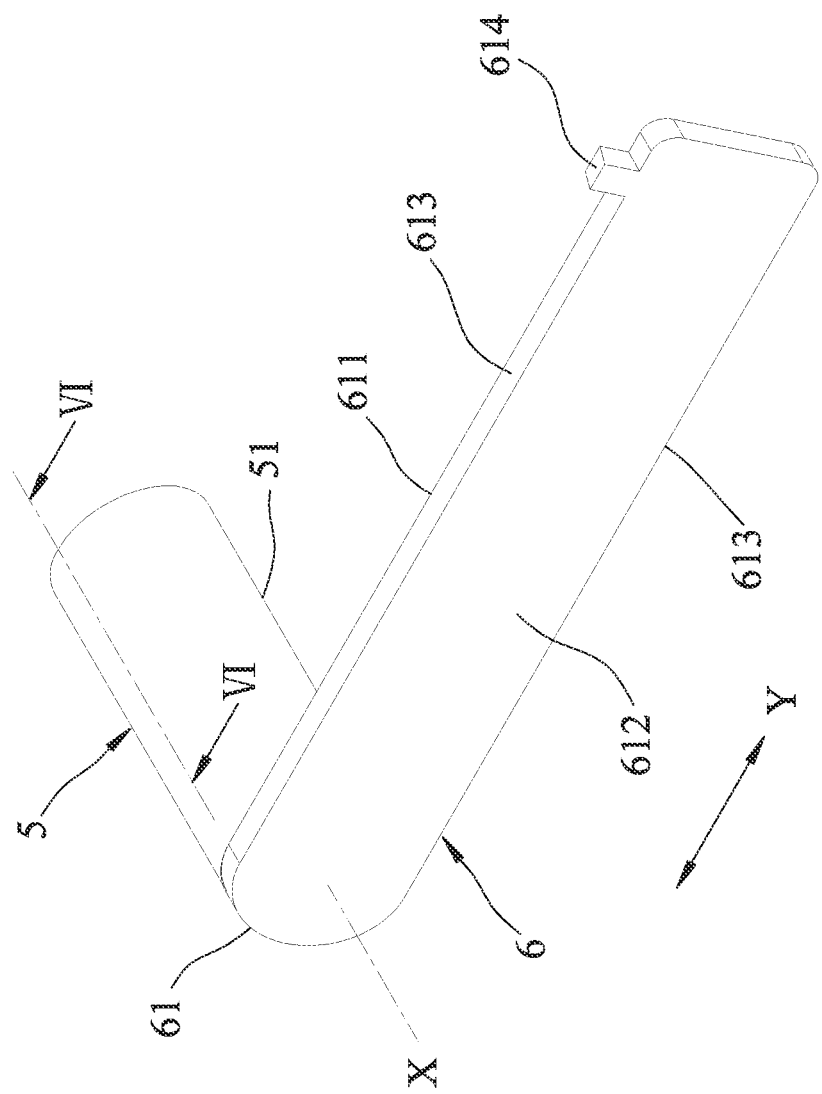
FIG. 2 is a perspective view of a towel holder according to an embodiment of the present disclosure.

Before the present invention is described in greater detail, it should be noted that where considered appropriate, reference numerals or terminal portions of reference numerals have been repeated among the figures to indicate corresponding or analogous elements, which may optionally have similar characteristics.

Referring to FIGS. 2 to 5, an embodiment of a towel holder according to the present disclosure is shown. The towel holder is adapted to be mounted on a wall (W) (see FIG. 6) and includes a fixing unit 5, a holder unit 6, and a wall mounting unit 7. Note that the towel holder may include more than one fixing units 5 in other embodiments.

The fixing unit 5 extends along a horizontal axis (X) and includes a fixed element 51, a connecting element 52, and a first fastening member 53. The fixed element 51 is tubular and is formed with a hole 513 in which the connecting element is detachably mounted. The first fastening member 53 fastens the connecting element 52 to the fixed element 51. The connecting element 52 interconnects the fixed element 51 and the holder unit 6.

Specifically, the fixed element 51 has an abutment surface 511 adapted to contact the wall (W), and a receiving surface 512 opposite to the abutment surface 511 along the horizontal axis (X). The receiving surface 512 is inclined relative to the horizontal axis (X) to form a first included angle (θ1) (see FIG. 4) between the horizontal axis (X) and the receiving surface 512. The first included angle (θ1) ranges from 70 degrees to 80 degrees, and is 75 degrees in this embodiment.

The fixed element 51 includes a mounting portion 514 formed between the abutment surface 511 and the receiving surface 512. In this embodiment, the fixed element 51 is made of metal and has a thickness (T) ranging from 0.7 millimeters to 0.9 millimeters along a radial direction transverse to the horizontal axis (X).

The connecting element 52 has a first end surface 521, a second end surface 522, a threaded hole 523, an insertion recess 524, and a reception recess 525. The first end surface 521 is connected to the mounting portion 514. The second end surface 522 is opposite to the first end surface 521 along the horizontal axis (X), is detachably connected to the holder unit 6 (see FIG. 5), and is inclined relative to the horizontal axis (X) to form a second included angle (θ2) between the horizontal axis (X) and the second end surface 522. In this embodiment, the second included angle (θ2) is the same as the first included angle (θ1) and thus the receiving surface 512 is co-planar with the second end surface 522. Note that the present disclosure is not limited to this aspect.

The threaded hole 523 is formed in the first end surface 521 of the connecting element 52 and extends along the horizontal axis (X). The first fastening member 53 extends through a through hole 516 formed in the mounting portion 514, abuts against the mounting portion 514, and threadedly engages the threaded hole 523 formed in the first end surface 521, such that the connecting element 52 is fastened to the mounting portion 514.

The insertion recess 524 is disposed between the first end surface 521 and the second end surface 522, is disposed in a bottom end portion of the connecting element 52, and is in spatial communication with the reception recess 525 formed in the second end surface 521. In this embodiment, the connecting element 52 is made of zinc spelter material and is formed integrally.

The holder unit 6 is detachably mounted to the connecting element 52 and includes a holder element 61, a nut element 62, and a second fastening member 63. In this embodiment, the holder element 61 is an elongated plank extending along a transverse direction (Y) transverse to the horizontal axis (X) and has a thickness (d) (see FIG. 5) ranging from 2.7 millimeters to 4.7 millimeters. Further, the holder element 61 has a mounting surface 611, an exterior surface 612, top and bottom edges 613, and a protrusion 614.

The mounting surface 611 is complementary in shape with and abuts against the receiving surface 512 of the fixed element 51, and is also inclined relative to the horizontal axis (X) by the first included angle (θ1). In this embodiment, the exterior surface 612 is opposite to and parallel to the mounting surface 611, and the top and bottom edges 613 interconnects the exterior surface 612 and the mounting surface 611. The top edge 613 is proximate to the abutment surface 511 along the horizontal axis (X), while the bottom edge 613 is distal from the abutment surface 511 along the horizontal axis (X). In this embodiment, the top and bottom edges 613 are connected to the mounting surface 611 and are vertically and horizontally spaced apart from each other such that two opposite ends 81 of a towel 8 (see FIG. 7) hung on the holder element 61 are spaced apart from each other by a horizontal distance greater than that between the top and bottom edges 613 along the horizontal axis (X). The protrusion 614 protrudes from the top edge 613, is spaced apart from the fixed element 51 along the transverse direction (Y), and is adapted for confining the towel 8 between the fixed element 51 and the protrusion 614.

The nut element 62 is connected fixedly to the mounting surface 611 of the holder element 61 and is received within the reception recess 525 of the connecting element 52. The second fastening member 63 threadedly engages the nut element 62 to fasten the holder unit 6 to the connecting element 52.

Figure 5:
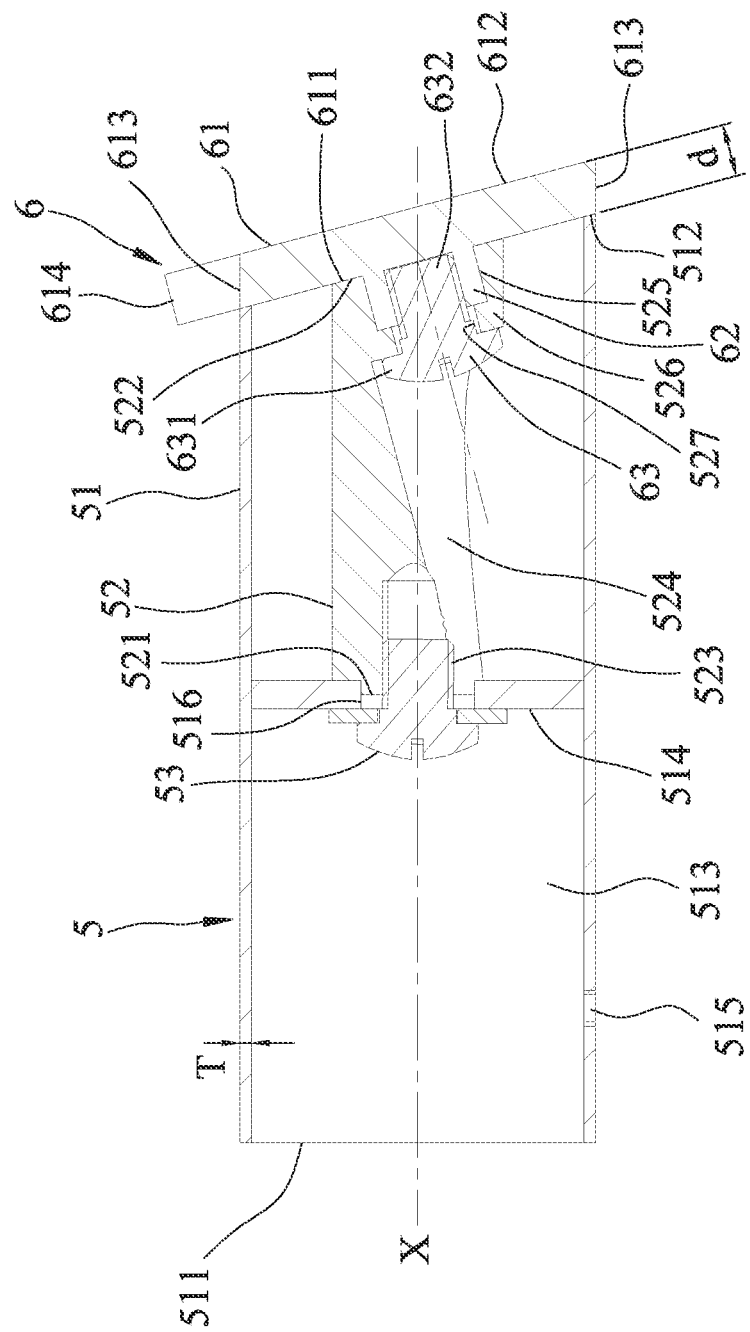
FIG. 5 is a schematic sectional view of the towel holder of the embodiment, illustrating a holder unit of the towel holder being mounted to the connecting element of the fixing unit.

Specifically, as shown in FIG. 5, the connecting element further has an inward flange 526 disposed between the reception recess 525 and the insertion recess 524, and is formed with a hole 527. The second fastening member 63 has a head 631 disposed in the insertion recess 524 and abutting against the inward flange 526, and an externally-threaded stem 632 extending through the hole 527 formed in the inward flange 526 and threadedly engaging the nut element 62 to secure the holder element 61 to the connecting element 52.

In this embodiment, the nut element 62 is welded to the mounting surface 611. After the holder unit 6 is assembled to the fixing unit 5, the nut element 62 is concealed in the reception recess 525 by the fixed element 51 and the solder cannot be seen.

Figure 3:
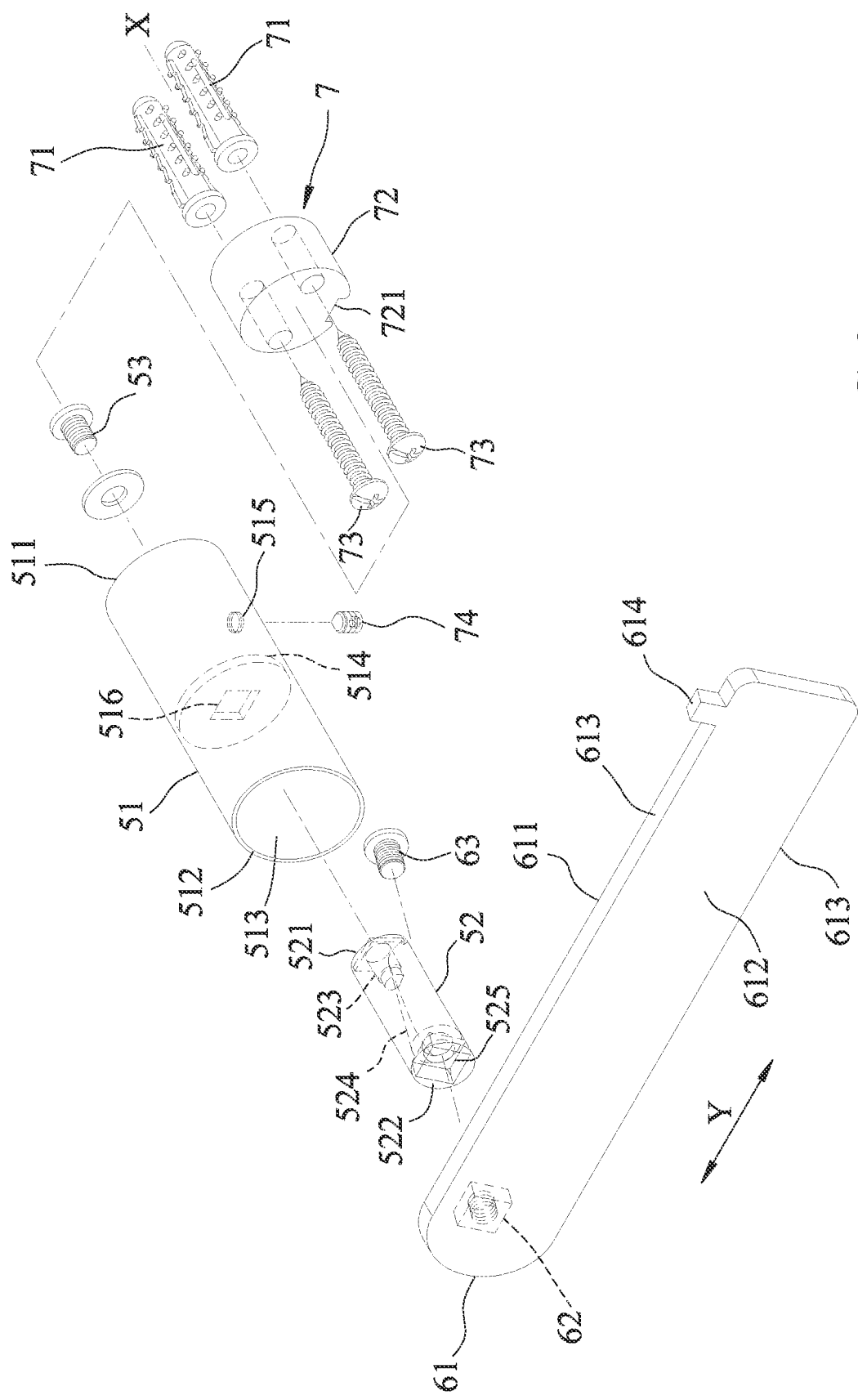
FIG. 3 is an exploded perspective view of the embodiment.
Figure 4:
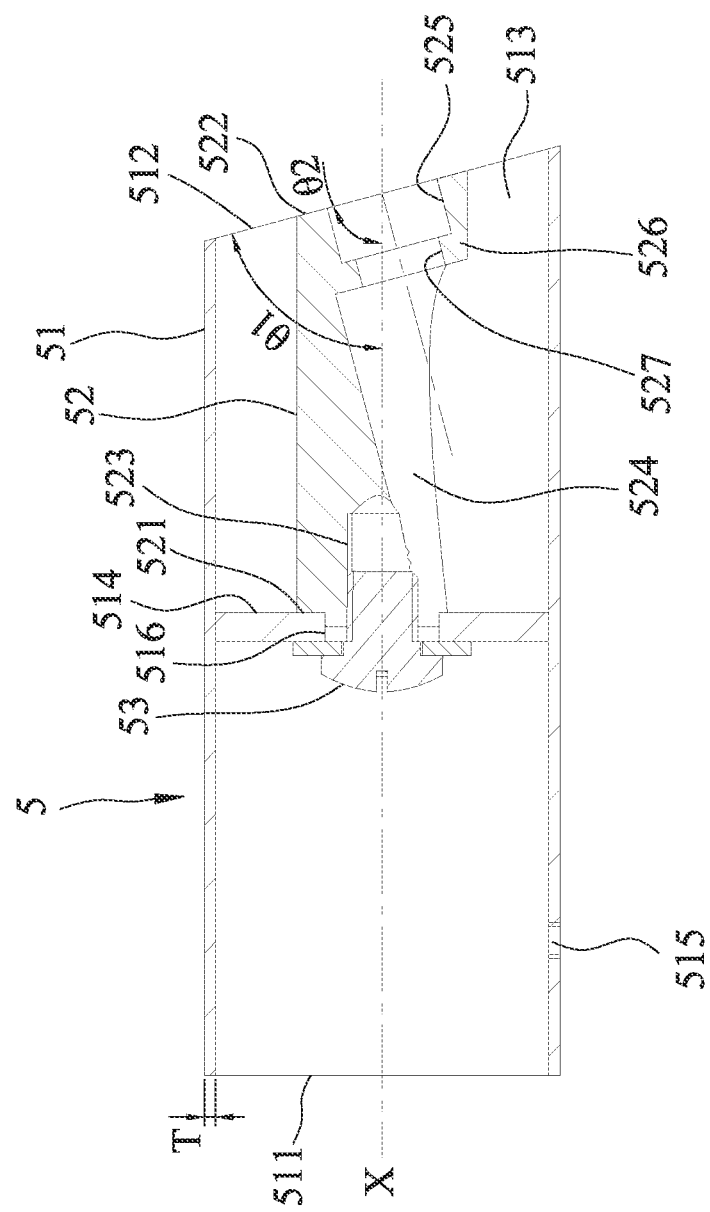
FIG. 4 is a schematic sectional view of a fixing unit of the towel holder of the embodiment, illustrating a connecting element being disposed in a fixed element of the fixing unit.
Figure 6:
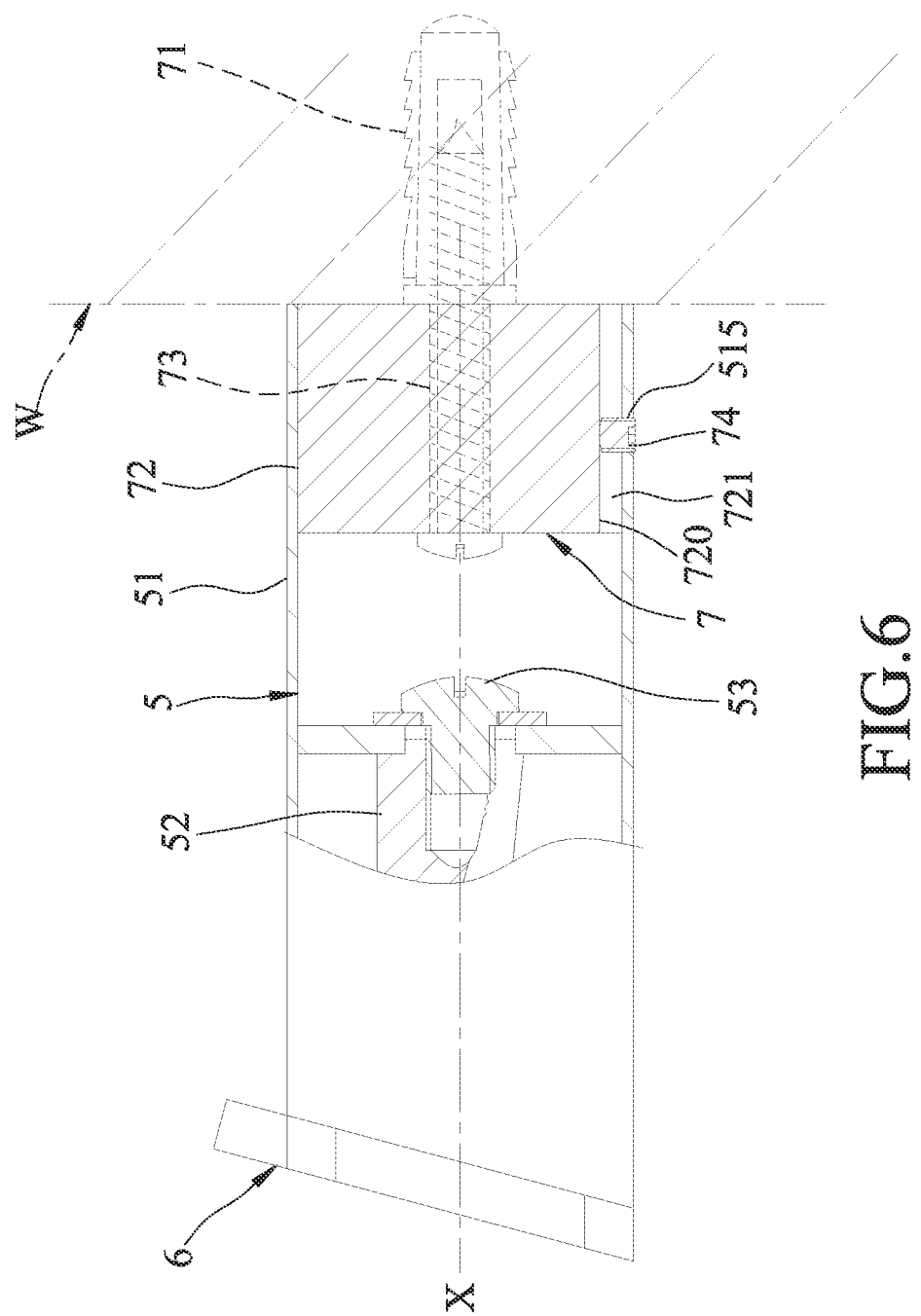
FIG. 6 is a schematic sectional view taken along line VI-VI in FIG. 2, illustrating the towel holder of the embodiment being mounted to a wall by a wall mounting unit.

Further referring to FIGS. 3 and 6, the wall mounting unit includes two expansion anchors 71, an interconnecting element 72, two third fastening members 73, and a lock bolt 74. Note that the numbers of the expansion anchors 71 and the third fastening members 73 is not limited to the example described herein as long as the number of the expansion anchors 71 is the same as that of the third fastening members 73. The expansion anchors 71 are adapted to be embedded in the wall (W). The interconnecting element 72 is disposed fixedly in the fixed element 51, has a groove-defining wall 720 defining a slot 721 extending along the horizontal axis (X), and is adapted to contact the wall (W). Specifically, the fixed element 51 is further formed with a through hole 515 extending in the radial direction transverse to the horizontal axis (X) and in spatial communication with the slot 721. The lock bolt 74 extends through the through hole 515 and into the slot 721 to press against the groove-defining wall 720 so as to lock the interconnecting element 72 in the fixed element 51.

Each of the third fastening members 73 extends through the interconnecting element 72 into a respective one of the expansion anchors 71 such that the interconnecting element 72 and the fixing unit 5 are secured on the wall (W). It should be noted that the main feature of the present disclosure does not reside in the configuration of the wall mounting unit 7, other wall mounting unit capable of mounting the fixing unit 5 to the wall (W) may be employed in other embodiments of the present disclosure.

To assemble the towel holder of the present disclosure, the nut element 62 that is previously welded onto the holder element 61 is first brought to be received in the reception recess 525 of the connecting element 52 until the mounting surface 611 of the holder element 61 abuts against the receiving surface 512 of the fixed element 51. Next, the second fastening member 63 is brought into the insertion recess 524 to move into the reception recess 525 through the hole 527 formed in the inward flange 526. Then, the second fastening member 63 is brought to be received in the reception recess 525 through the insertion recess 524 to threadedly engage the nut element 62 such that the holder element 61 is fastened to the connecting element 52. At this time, the head 631 of the second fastening member 63 is disposed in the insertion recess 524 and abuts against the inward flange 526.

Subsequently, the first fastening member 53 is brought into the hole 513 formed in the fixed element 51 to extend through the through hole 516 formed in the mounting portion 514, to abut against the mounting portion 514, and to threadedly engage the threaded hole 523 of the connecting element 52. In this way, the connecting element 52 is fastened to the fixed element 51 to complete assembly of the towel holder.

Figure 7:
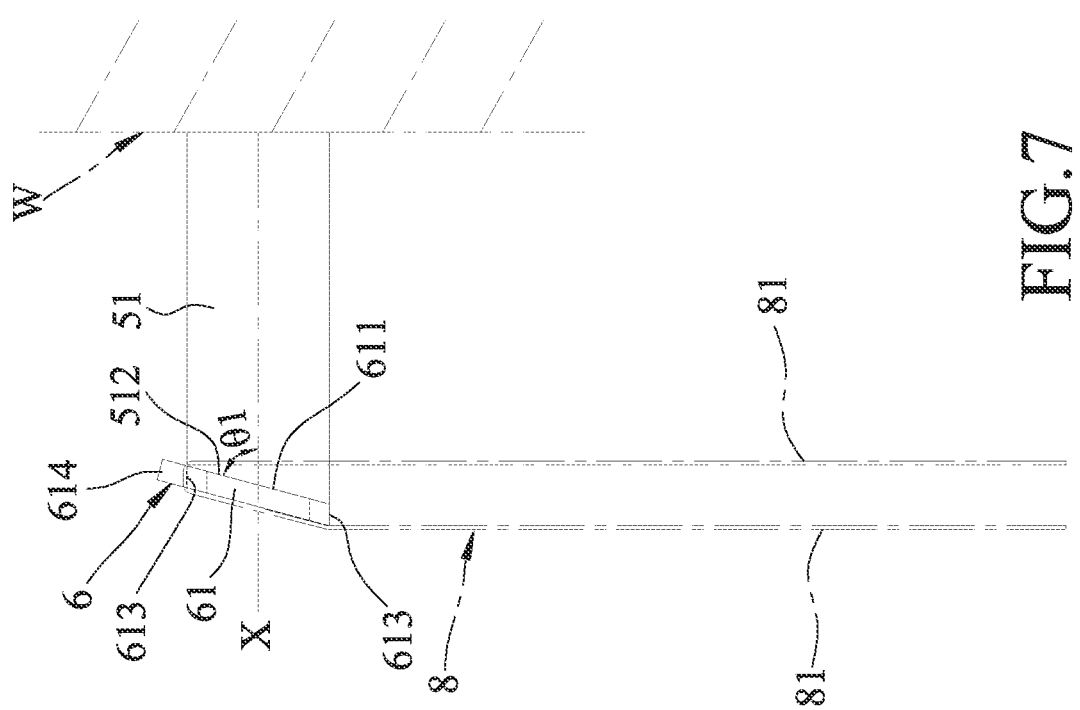
FIG. 7 is a schematic side view of the towel holder of the embodiment, illustrating a towel being hung on the towel holder.

Further referring to FIG. 7, the protrusion 614 protruding from the top edge 613 confines the towel 8 between the fixed element 51 (see FIG. 2) and the protrusion 614 when the towel 8 is hung on the holder element 61, such that the towel 8 would not fall off from the holder element 61 along the transverse direction (Y). Further, since the mounting surface 611 of the holder element 61 is complementary in shape with and abuts against the receiving surface 512, the holder element 61 is also inclined relative to the horizontal axis (X) by the first included angle (θ1), and thus two opposite ends 81 of the towel 8 are spaced apart from each other along the horizontal axis (X) by the horizontal distance greater than that between the top and bottom edges 613 of the holder element 61 along the horizontal axis (X).

Figure 8:
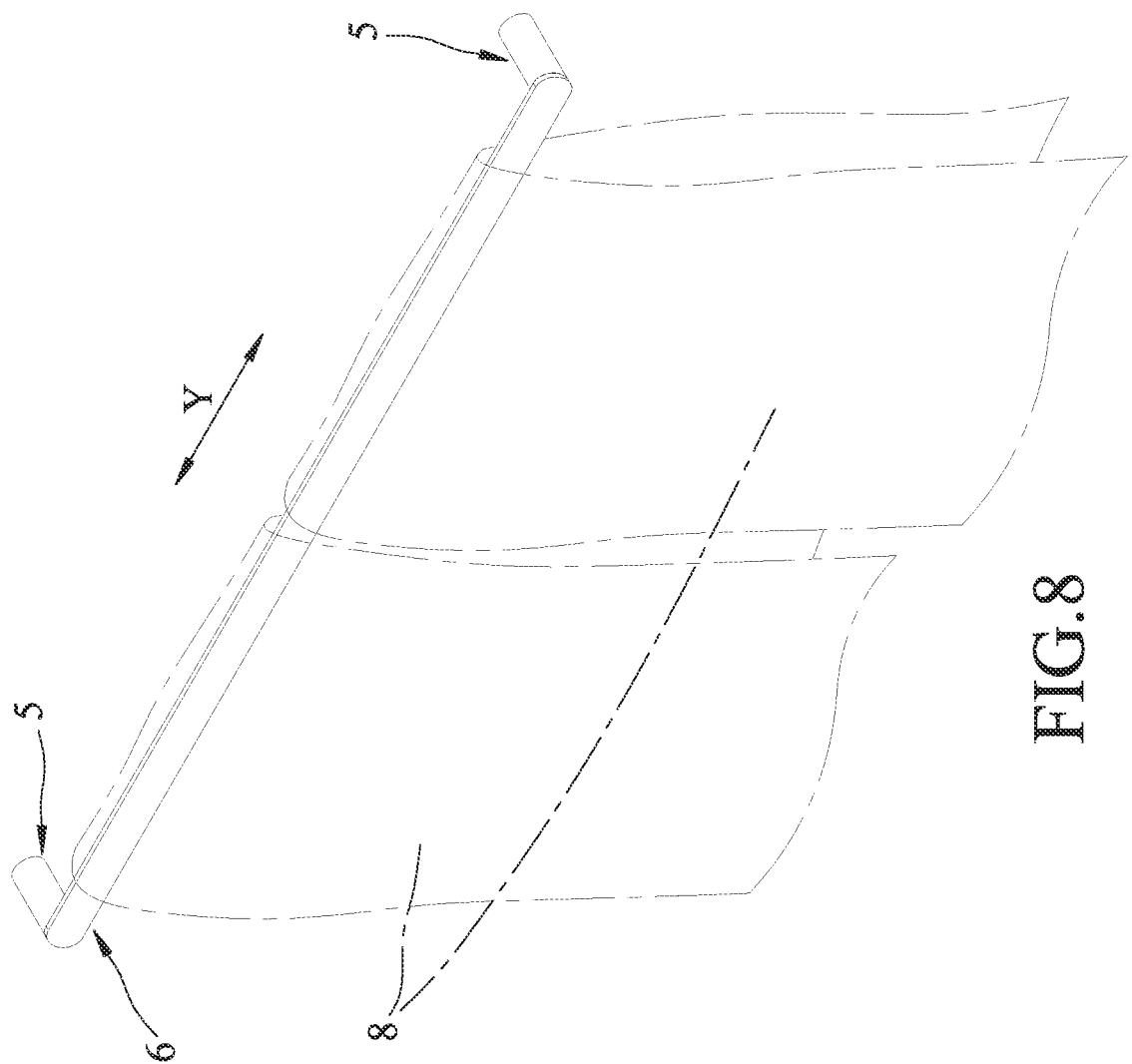
FIG. 8 is a schematic perspective view of another embodiment of the towel holder of the present invention, illustrating the towel holder including two fixing units and two towels being hung on the holder unit.
Figure 9:
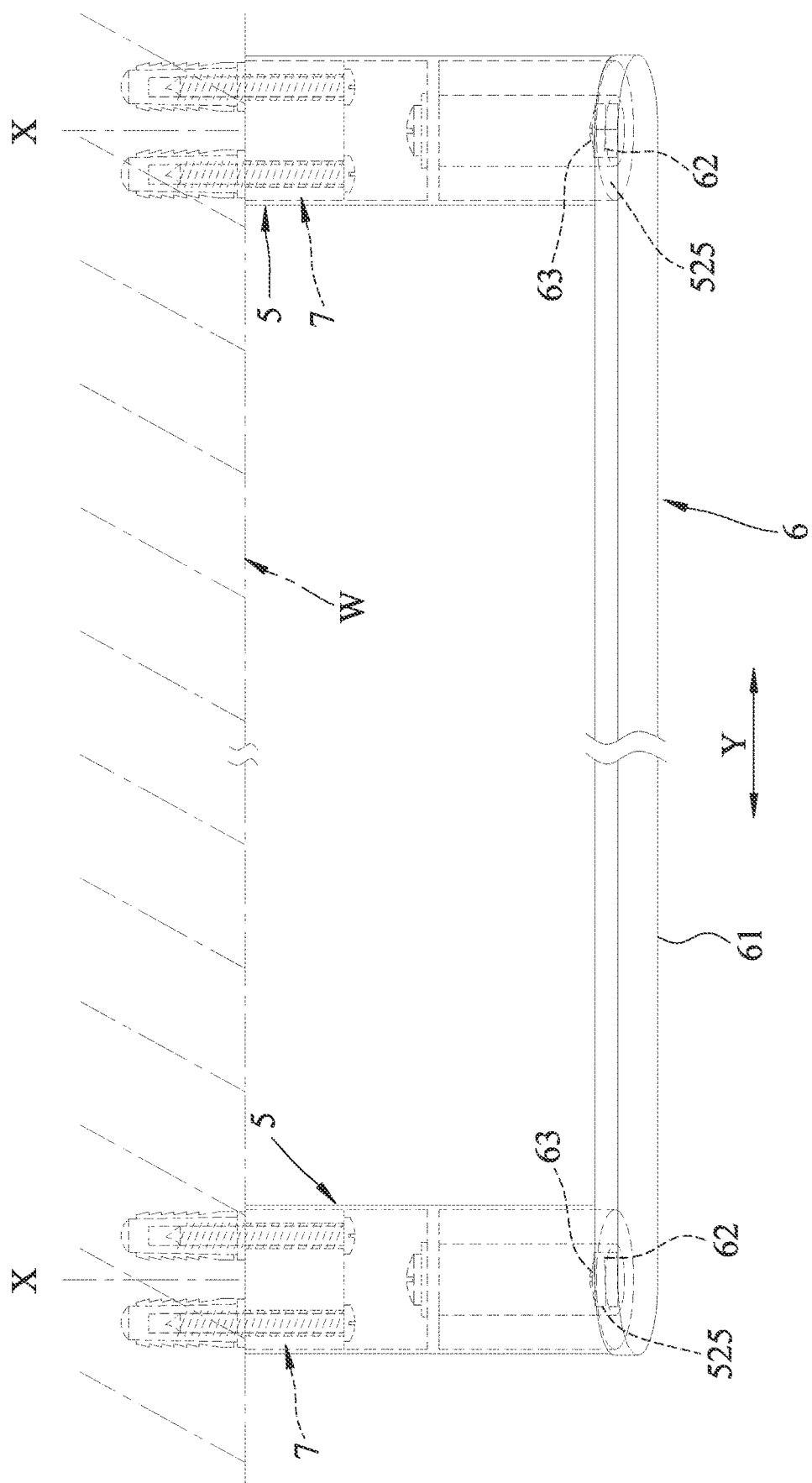
FIG. 9 is a schematic view of the embodiment shown in FIG. 8, illustrating two wall mounting units connecting the fixing units to the wall.

Referring to FIGS. 8 and 9, another embodiment of the towel holder of the present disclosure is shown. In this embodiment, the towel holder includes two of the fixing units 5 and two of the wall mounting units 7. The fixing units 5 are mounted to the wall (W) by the wall mounting units 7 and are spaced apart from each other along the transverse direction (Y). Further, the holder unit 6 includes two of the nut elements and two of the second fastening members 63. The nut elements 62 respectively correspond in position to the fixing units 5 and are received respectively within the reception recesses 525 of the fixing units 5. The second fastening members 63 respectively engage the nut elements 62 to fasten the holder unit 6 to the fixing units 5. In this embodiment, the protrusion 614 is omitted since the two fixing units 5 are capable of confining the towels 8 hung on the holder element 61 therebetween.

To sum up, by virtue of the design of the towel holder that includes the holder element 61 inclined relative to the horizontal axis (X) by the first included angle (θ1), two opposite ends of a towel hung on the holder element 61 are spaced apart from each other by a horizontal distance greater than that between the top and bottom edges 613. Thus, a moist towel hung on the holder element 61 can be air-dried at a higher speed than the conventional towel holder. Further, the size and cost of the holder element 61 need not to be increased.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A towel holder configured to be mounted on a wall, comprising:
    at least one fixing unit, wherein each fixing unit comprises:
        a cylindrical fixed element extending along a horizontal axis, wherein the fixed element has an abutment surface at a rear end thereof, wherein the abutment surface is configured to contact the wall and an inclined receiving surface defining a front surface of the fixed element opposite to the abutment surface along the horizontal axis and inclined rearwardly relative to the horizontal axis to form a first included angle between the horizontal axis and the receiving surface, wherein the fixed element further comprises a cavity defined through the receiving surface and a mounting portion plate within the cavity between the abutment surface and the receiving surface; and
        a connecting element comprising a front end and a rear end, wherein the rear end of the connecting element is detachably mounted to the mounting portion plate;
    a holder unit comprising a planar plank that has a mounting surface complementary in shape with and abutting against the receiving surface, wherein the plank is mounted to the front end of a first respective connecting element to secure the plank to a first respective fixed element with the plank being inclined rearwardly corresponding to the inclined receiving surface of the first respective fixed element, wherein the plank is configured to receive a towel thereon.

2. The towel holder as claimed in claim 1, wherein a first end of the plank is attached to the first respective connecting element and a second end of the plank is a distal free end.

3. The towel holder as claimed in claim 1, wherein each first included angle ranges from 70 degrees to 80 degrees.

4. The towel holder as claimed in claim 1, wherein for each fixing unit: the front surface of the connecting element is detachably connected to the plank of the holder unit, and the front surface of the connecting element is inclined relative to the horizontal axis to form a second included angle between the horizontal axis and the front surface of the connecting element.

5. The towel holder as claimed in claim 4, wherein for each fixing unit: the first included angle is the same as the second included angle, and the receiving surface is co-planar with the front surface of the connecting element.

6. The towel holder as claimed in claim 4, wherein each fixing unit further comprises a first fastening member extending through and abutting against a respective mounting portion plate, and each connecting element has a threaded hole formed in the rear surface thereof extending along the horizontal axis of each fixed element respectively, wherein a respective first fastening member threadedly engages a respective threaded hole such that each connecting element is fastened to a respective mounting portion plate.

7. The towel holder as claimed in claim 6, wherein each connecting element further comprises: a reception recess formed in the front surface, an insertion recess disposed in a middle portion of the connecting element between the front surface of the connecting element and the rear surface of the connecting element and in spatial communication with the reception recess, and an inward flange disposed between the reception recess and the insertion recess and formed with a hole; wherein the plank of the holder unit further comprising a nut element connected fixedly to the mounting surface and received within a respective reception recess, and wherein a second fastening member extends through a respective hole in a respective inward flange, threadedly engaging the nut element to fasten the holder unit to a respective connecting element, and having a head disposed in the respective insertion recess and abutting against the respective inward flange.

8. The towel holder as claimed in claim 1, further comprising a wall mounting unit comprising:
- at least one expansion anchor adapted to be embedded in the wall;
- a corresponding interconnecting element disposed fixedly in each fixed element respectively, having a groove-defining wall defining a slot extending along a respective horizontal axis, and adapted to contact the wall, each fixed element being further formed with a through hole extending in a radial direction transverse to each horizontal axis and in spatial communication with each slot respectively;
- at least one third fastening member extending through a respective interconnecting element into the corresponding expansion anchor such that the respective interconnecting element is secured on the wall; and
- a lock bolt extending through a respective through hole and into a respective slot to press against the respective groove-defining wall so as to lock a respective interconnecting element in each fixed element respectively.

9. The towel holder as claimed in claim 1, wherein the at least one fixing unit comprises two fixing units spaced apart from each other along a transverse direction transverse to each horizontal axis, the holder unit comprising two nut elements that correspond in position respectively to the fixing units, and two second fastening members that respectively engage the nut elements.

10. The towel holder as claimed in claim 1, wherein the plank extends along a transverse direction transverse to a respective horizontal axis and has a thickness ranging from 2.7 millimeters to 4.7 millimeters.

11. The towel holder as claimed in claim 10, wherein the plank further comprises a protrusion that protrudes from one of a top edge or a bottom edge of the plank, wherein the towel is configured to be confined between a respective fixed element and the protrusion.

12. The towel holder as claimed in claim 1, wherein each fixed element has a thickness ranging from 0.7 millimeters to 0.9 millimeters along a radial direction transverse to each horizontal axis respectively.

13. The towel holder as claimed in claim 1, wherein each fixed element is made of metal.

14. The towel holder as claimed in claim 1, wherein each connecting element is made of a zinc spelter material.

\* \* \* \* \*